United States Patent [19]

Tsunoda et al.

[11] Patent Number: 4,805,716
[45] Date of Patent: Feb. 21, 1989

[54] MOTORCYCLE BODY FRAME STRUCTURE

[75] Inventors: Kazuhiko Tsunoda; Hiroyuki Furuyama; Toshimitsu Asakura; Tomoyuki Tagami, all of Saitama, Japan

[73] Assignee: Honda Giken Kogyo Kabushiki Kaisha, Tokyo, Japan

[21] Appl. No.: 84,349

[22] Filed: Aug. 12, 1987

[51] Int. Cl.$^4$ .............................................. B62D 61/02
[52] U.S. Cl. .................................... 180/219; 180/227; 180/228; 280/834
[58] Field of Search .......................... 280/281 R, 5 A; 180/219, 311, 312, 227, 228, 69.4; 137/571, 576, 587; 222/479, 481.5; 220/205

[56] References Cited

U.S. PATENT DOCUMENTS 4,660,854 4/1987 Suzuki et al. .................. 280/281 R
4,673,053 6/1987 Tanaka et al. ...................... 180/227
4,694,929 9/1987 Sugimato ........................... 180/311

FOREIGN PATENT DOCUMENTS

2575719 7/1986 France .......................... 280/281 R

Primary Examiner—David M. Mitchell
Assistant Examiner—Richard Camby
Attorney, Agent, or Firm—Pollock, Vande Sande & Priddy

[57] ABSTRACT

A motorcycle body frame structure made of an aluminum-based alloy, and suitable for off-road jumping and landing due to its increased rigidity and toughness, and the large stroke of its shock absorber. Maintenance is facilitated because the upper frame member is detachable from the head pipe and from the coupling member connecting the rear portions of the upper and lower frame members. The strength of the engine hanger is enhanced by securing it to a member connecting the front and rear frame portions. A large-size fuel tank is accommodated in a space defined between the upper frame member and left and right lower frame members.

10 Claims, 12 Drawing Sheets

MOTORCYCLE BODY FRAME STRUCTURE

FIELD OF THE INVENTION

The present invention relates to a body frame structure for motorcycles made of an aluminum-based alloy.

BACKGROUND OF THE INVENTION

In motorcycles, especially those for off-road use, having an engine located between the front and rear wheels and supported by a body frame made of aluminum-based alloy, with front and rear forks for supporting the front and rear wheels, and a shock absorber disposed between the body frame and the rear fork, it is important to provide sufficient rigidity and toughness for jumping and landing, and to provide for a large stroke for the shock absorber.

SUMMARY OF THE INVENTION

It is an object of the present invention to provide a structure which meets these requirements, without necessitating an increase in the height and width of the motorcycle while accommodating a large capacity fuel tank.

The invention also permits easier maintenance of the engine and other parts because the upper frame member of the cycle is detachable from the head pipe and from the coupling member connecting the rear portions of the upper frame member and the lower frame members.

The invention further provides an engine hanger structure which is simple and light, yet has increased strength because it is secured to the member which connects the front and rear frame portions of the cycle.

Other objects and advantages will appear from the description which follows, and from the appended claims.

BRIEF DESCRIPTION OF THE DRAWINGS

In order that the invention may be more clearly understood, reference will now be made to the accompanying drawings, in which various aspects of the invention are illustrated by way of example, and in which.

DESCRIPTION OF PREFERRED EMBODIMENTS

Figure 1:
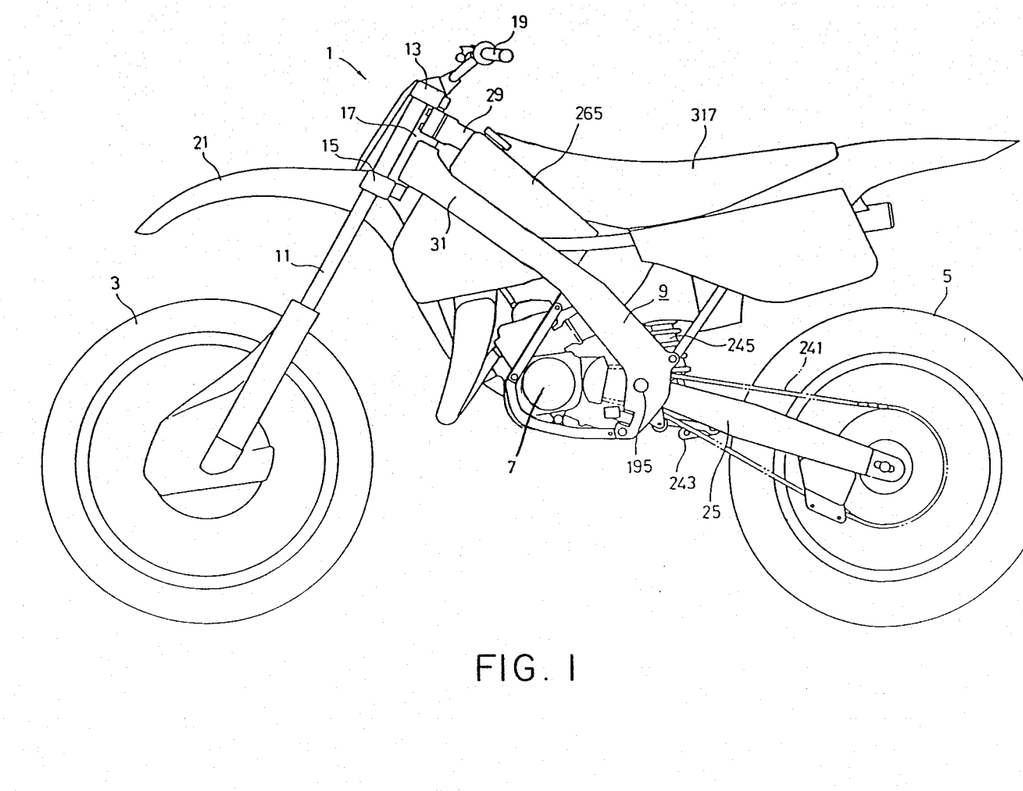
FIG. 1 is a side view of a motorcycle of the type to which the invention applies.
Figure 2:
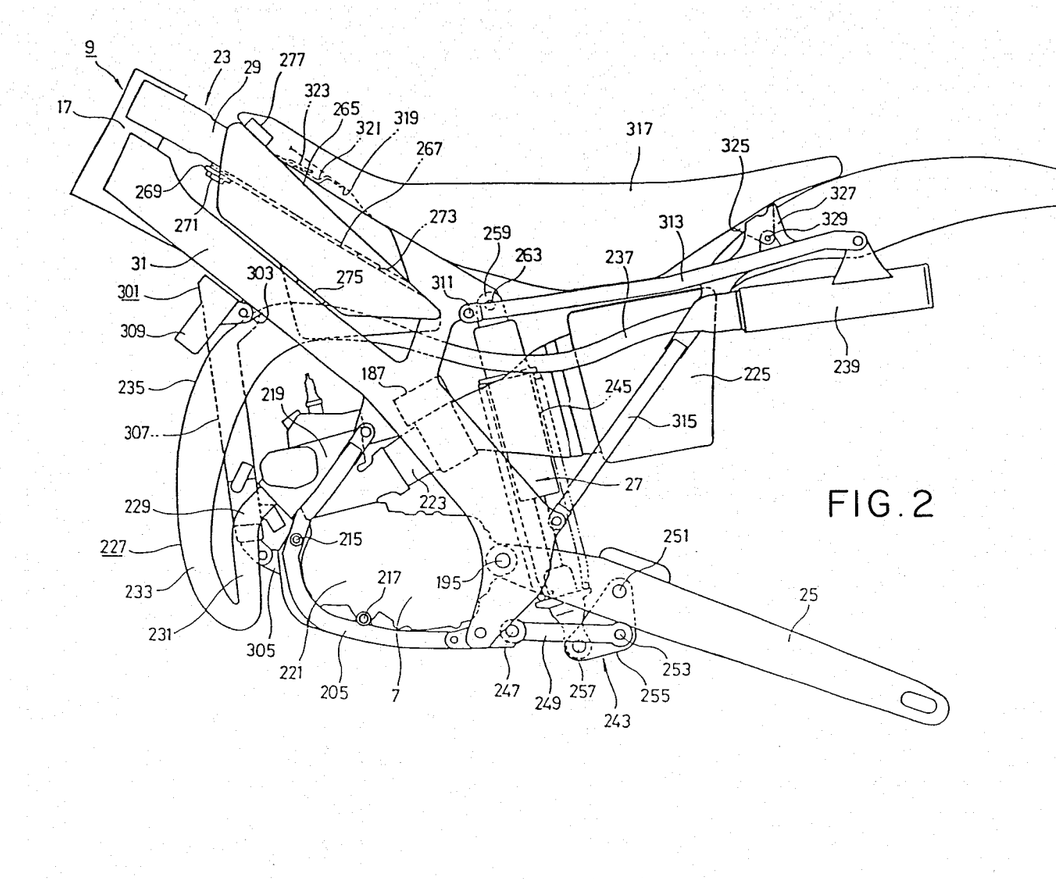
FIG. 2 is a side view of a detail of the motorcycle.

As shown in FIG. 1, motorcycle 1 has a front wheel 3, a rear wheel 5, and an engine 7 located between these wheels and supported by a body frame 9.

The front wheel 3 is suspensibly supported by right and left front forks 11. The upper portions of the right and left forks 11 are connected by means of a top bridge 13 and a bottom bridge 15. A steering stem which is provided between the bridges 13 and 15 is steerably supported by a head pipe 17 disposed at the front end of the body frame 9, and a handlebar 19 is provided on the upper side of the top bridge 13.

The body frame 9 is made of aluminum-based alloy and has a front frame portion 23 and a rear frame portion 27, the front frame portion 23 extending rearwardly from the head pipe 17 above the engine 7, and the rear frame portion 27 being connected to the front frame portion 23 and provided with a portion to which is pivotally connected a rear fork 25 which supports the rear wheel 5.

The front frame portion 23 comprises one upper frame member 29 and a pair of right and left lower frame members 31, the upper frame member 29 extending obliquely rearward from the upper portion of the head pipe 17 above the engine 7, and the lower frame members 31 extending obliquely rearward from the lower portion of the head pipe 17 above the engine 7. The rear frame portion 27 consists of a pair of right and left connecting plates 33A and 33B.

Figure 4:
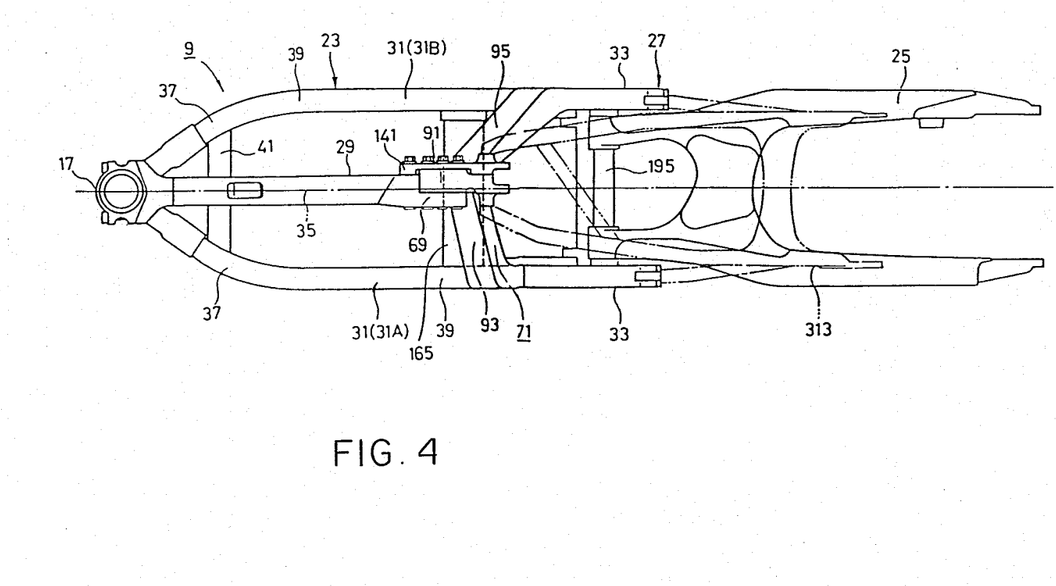
FIG. 4 is a plan view of a portion of the body frame.
Figure 5:
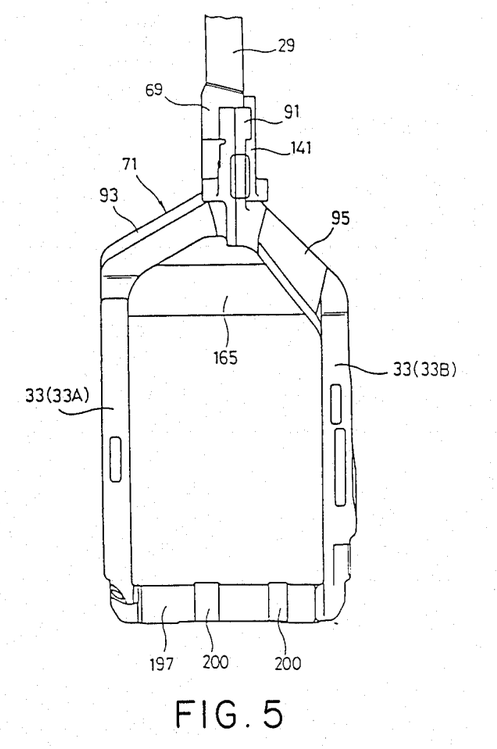
FIG. 5 shows part of the body frame as seen from the direction indicated by arrow V in FIG. 3.

The upper frame member 29 extends straight rearwardly along the longitudinal central line 35 (FIG. 4), while the lower frame members 31 are in substantially symmetrical reation to each other with respect to the central line 35, and each lower frame member 31 has a curved portion 37 which extends rearwardly from the head pipe 17 while diverging laterally outward, and a straight portion 39 which extends straight rearwardly from the rear end of the curved portion 37. The curved portions 37 of the pair of lower frame members 31 are connected together with a cross pipe 41.

Figure 3:
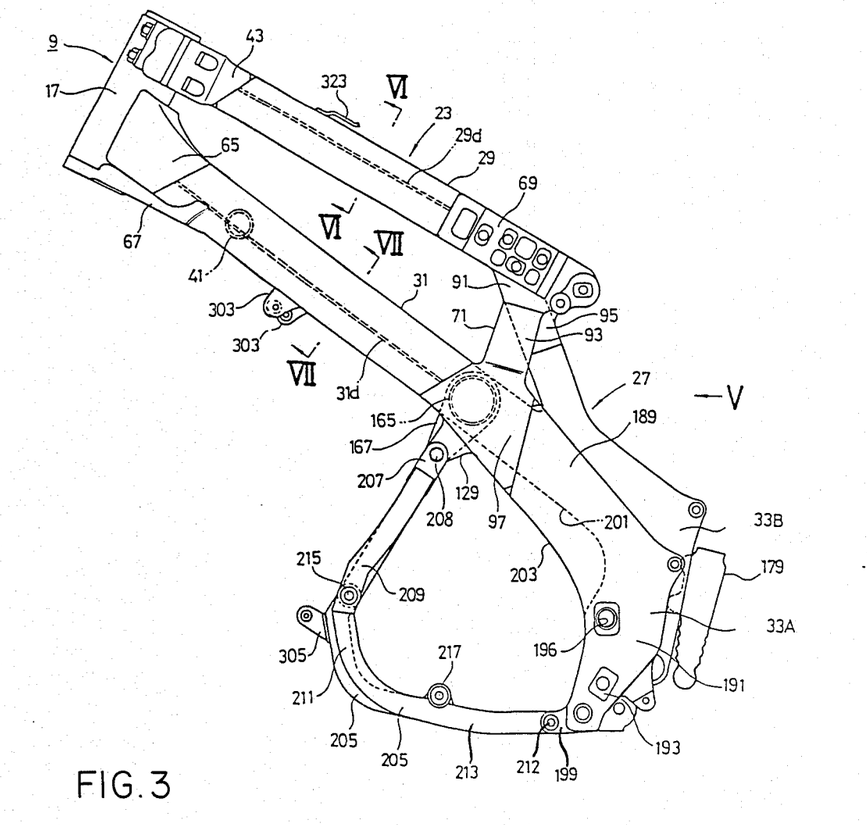
FIG. 3 is a side view of a portion of the body frame.
Figure 6:
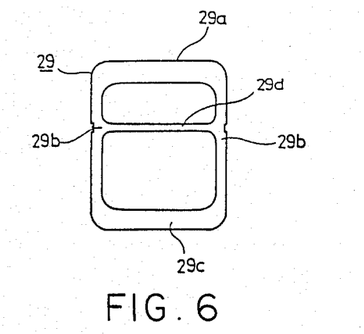
FIGS. 6 and 7 are sectional views along lines VI—VI and VII—VII, respectively, of FIG. 3.
Figure 7:
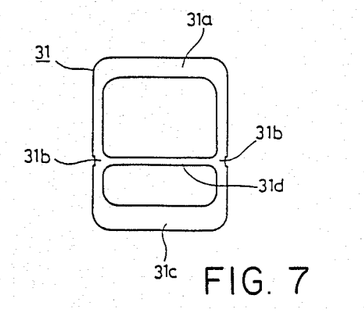

The upper and lower frame members 29 and 31 are respectively composed of upper pieces 29a, 31a, side pieces 29b, 31b and lower pieces 29c, 31c which constitute in combination hollow rectangular cross-sections as shown is FIGS. 6 and 7 which are sectional views taken along the lines VI—VI and VII—VII, respectively, of FIG. 3, and reinforcing walls 29d and 31d extend between the side pieces 29b and between the side pieces 31b, respectively. These frame members 29 and 31 are formed using members having a substantially B-shaped cross-section.

A connecting member 43 is secured to the front end of the upper frame member 29, and is detachably secured to the upper portion of the head pipe 17.

Figure 8:
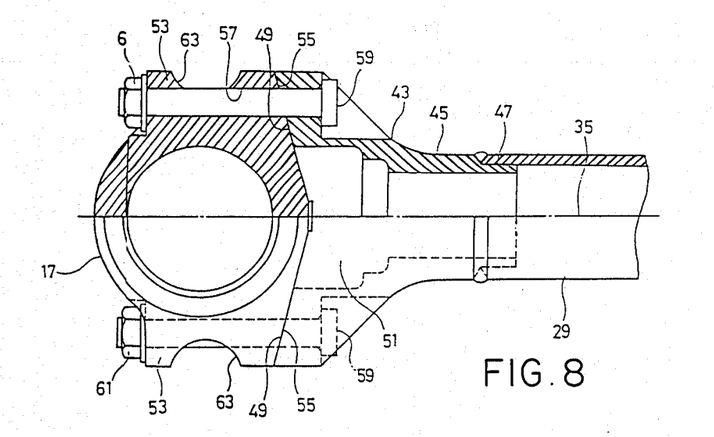
FIG. 8 is a half-sectioned plan view showing the attachment of the upper frame member to the head pipe.
Figure 9:
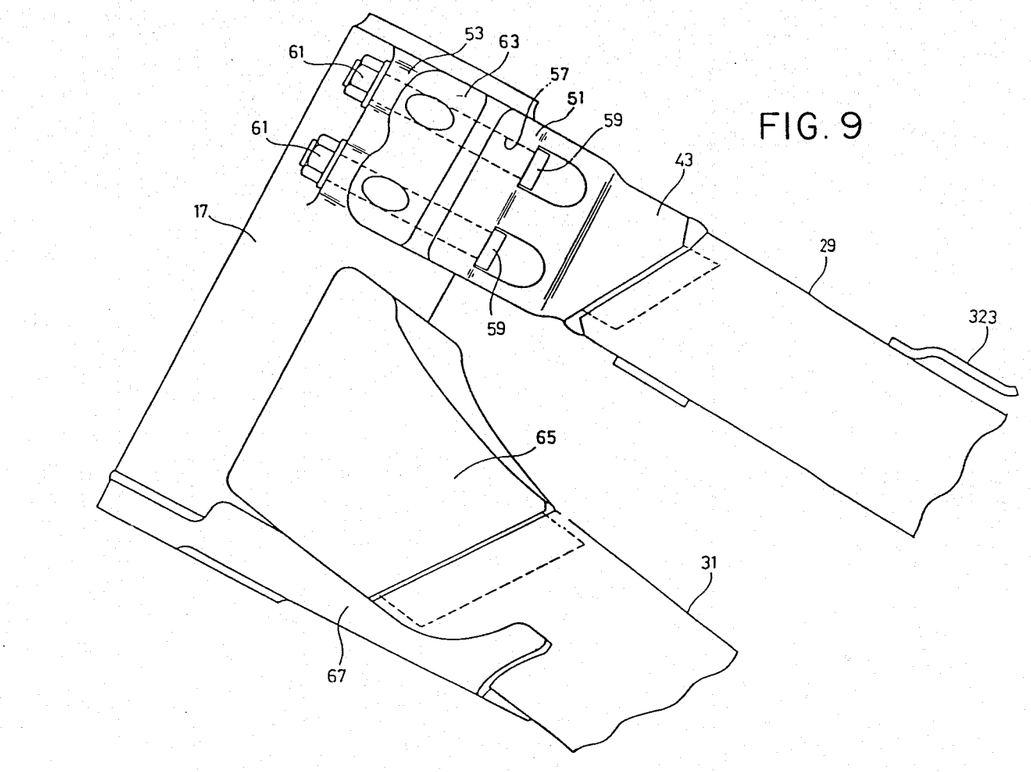
FIG. 9 is a side view of the attachment structure shown in FIG. 8.

As shown in FIGS. 8 and 9, the connecting member 43 is a hollow member having a substantially Y-shaped configuration in a plan view, and has rectangular base portion 45 which is contiguous with the upper frame member 29, a fitting portion 47 formed at the rear end of the base portion 45 and fitted to the upper frame member 29, and a bifurcated securing portion 51 having fitting surfaces 49 facing the head pipe 17. The connecting member 43 is connected to the upper frame member 29 in such a manner that the fitting portion 47 is fitted to the front end of the upper frame member 29 and the fitting portions are welded together.

The connecting member 43 is connected to the head pipe 17 in such a manner that the fitting surfaces 49 are fitted to fitting surfaces 55 of securing portions 53 of the head pipe 17, the mounting portions 53 projecting from the left and right sides, respectively, of the head pipe 17, and the corresponding mounting portions 51 and 53 are fastened to each other by means of nuts 61 and bolts 59 received through bolt receiving bores 57. The reference numeral 63 denotes grooves defined by hollow walls.

The lower frame members 31 are secured to the head pipe 17 by means of welding through connecting members 65 and 67.

The coupling member 69 is welded to the rear end of the upper frame member 29, and this coupling member 69 and the rear end of the left-hand lower frame member 31A are connected together with a center member 71. The pair of left and right connecting plates 33 are provided through the center member 71.

Figure 10:
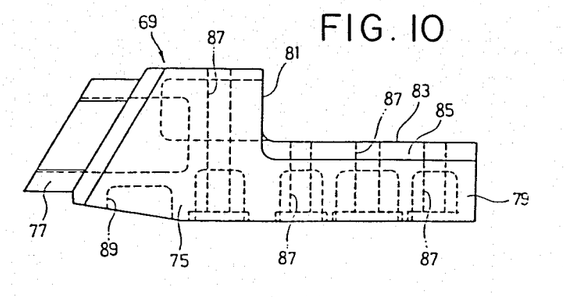
FIGS. 10 and 11 are plan and side views of the coupling members.
Figure 11:
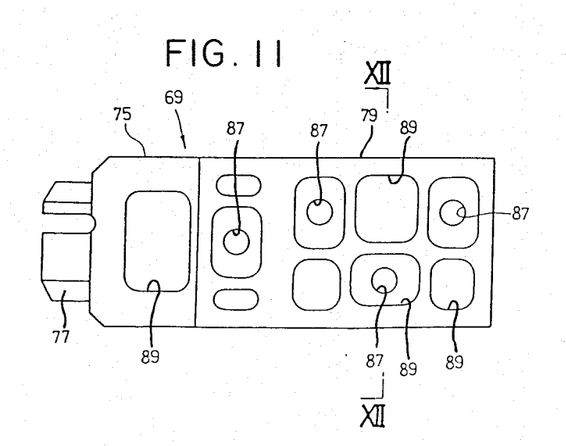
Figure 12:
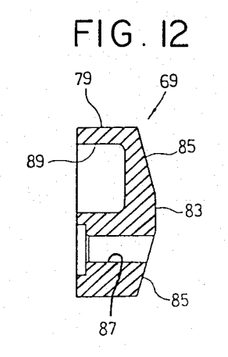
FIG. 12 is a section view along line XII—XII of FIG. 11.

The coupling member 69 is shown in detail in FIGS. 10, 11 and 12 which are respectively a plan view, side view and sectional view which is taken along the line XII—XII of FIG. 11. As illustrated, the coupling member 69 has a base portion 75, a fitting portion 77 projecting from the front end of the base portion 75 and fitted to the rear end of the upper frame member 29, and a mounting portion 79 extending rearwardly from the left-half portion of the base portion 75.

A flat fitting surface 81 is formed at the right-half portion of the rear end of the base portion 75. The mounting portion 79 has slant surfaces 85 extending obliquely upward and downward, respectively, from a vertically central portion 83, and bolt receiving bores 87 are provided in the base portion 75 and the slant surface portions 85 in such a manner that the bores 87 extend horizontally therethrough. The reference numeral 89 in the figures denotes grooves defined by hollow walls.

The center member 71 has an upper portion 91 which is fastened to the coupling member 69, a pair of left and right leg portions 93 and 95 extending from the left and right sides, respectively, of the upper portion 91 downwardly and laterally outward, and connecting portion 97 formed at the lower end of the left-hand leg portion 93.

Figure 13:
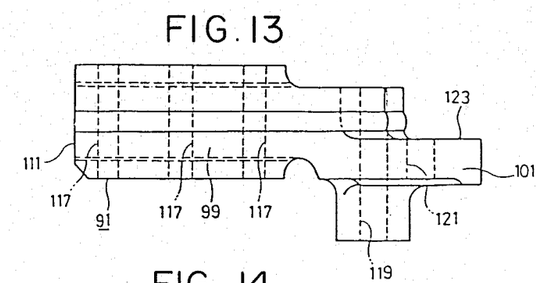
FIGS. 13 and 14 are plan and side views of the upper portion of the center member.
Figure 14:
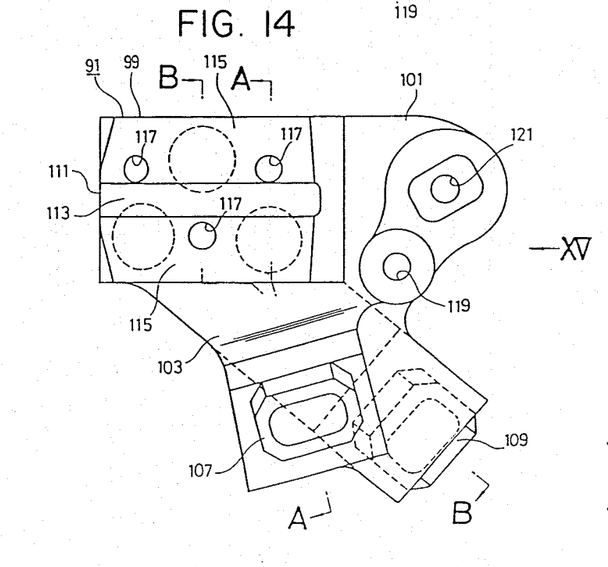
Figure 15:
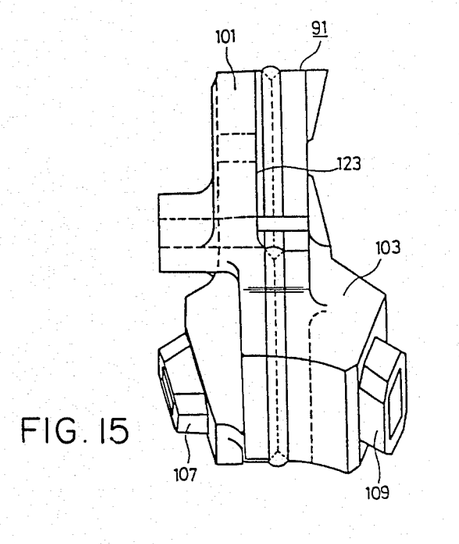
FIG. 15 is a view of the center member from the direction indicated by arrow by XV in FIG. 14.
Figure 16:
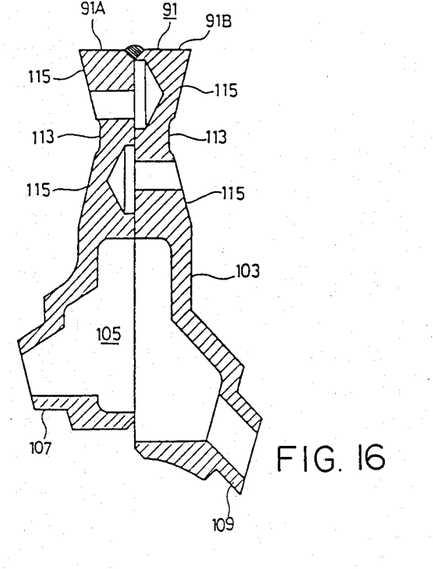
FIG. 16 is a composite sectional view along lines A—A and B—B, respectively, of FIG. 14.

The upper portion 91 is shown in detail in FIGS. 13, 14, 15 and 16. FIGS. 13 and 14 are a plan view and a side view, respectively. FIG. 15 shows the upper portion 91 as viewed in the direction of arrow XV of FIG. 14, and FIG. 16 is a composite sectional view composed of sectional views taken along the lines A—A and B—B, respectively, of FIG. 14. As illustrated, the upper portion 91 is formed by welding together a pair of left and right half members 91A and 91B.

The upper portion 91 has a mounting portion 99 corresponding to the mounting portion 79 of the coupling member 69, a shock absorber mounting portion 101 extending rearwardly from the rear end of the mounting portion 99, and a projecting portion 103 projecting downwardly from both the mounting portions 99 and 101.

A hollow portion 105 is formed inside the projecting portion 103 for the purpose of reducing the weight. Fitting portions 107 and 109 which are respectively fitted to the left and right leg portions 93 and 95 project from the left and right sides of the projecting portion 103 in such a manner that the fitting portions 107 and 109 are out of phase with each other in the longitudinal direction of the vehicle.

A flat fitting surface 111 is formed at the front end of the securing portion 99. Each of the left and right side surfaces of the mounting portion 99 is provided with slant surfaces 115 extending obliquely upward and downward, respectively, from a vertically central portion 113, and bolt receiving bores 117 are provided so as to extend through the slant surface portions 115.

The shock absorber securing portion 101 is provided with bolt receiving bores 119 and 121 which extend therethrough, and a cut portion 123 is formed in the right-hand side of the mounting portion 101 around the bolt receiving bore 121 at the rear end.

Figure 17:
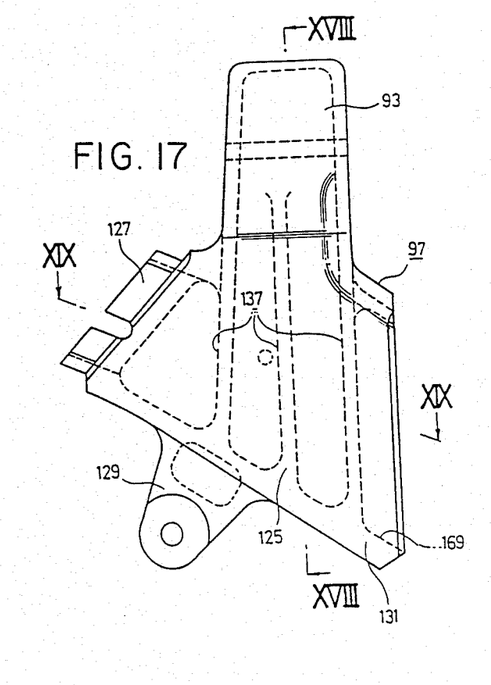
FIG. 17 is a side view of the connecting portion of the center member.
Figure 18:
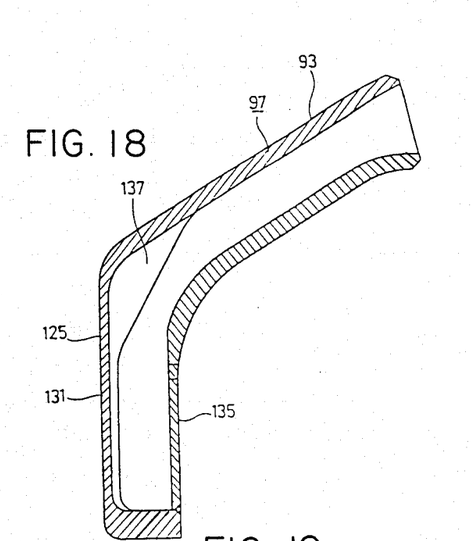
FIGS. 18 and 19 are sectional views along lines XVIII—XVIII and XIX—XIX of FIG. 17.
Figure 19:
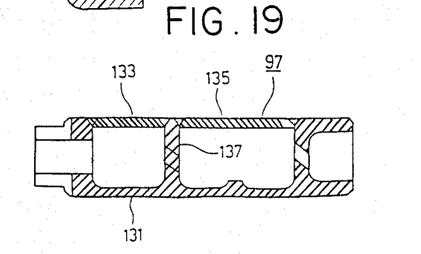

The connecting portion 97 is shown in detail in FIGS. 17, 18 and 19 which are respectively a side view and sectional views taken along the lines XVIII—XVIII and XIX—XIX, respectively, of FIG. 17. As illustrated, the connecting portion 97 has a base portion 125 having the left-hand portion 93 formed integral therewith, a fitting portion 127 formed at the front end of the base portion 125 and fitted to the rear end of the lower frame member 31, and a mounting piece 129 projecting from the lower side of the base portion 125. The connecting portion 97 is formed so as to be hollow by welding two plate members 133 and 135 to a member 131 which opens to the inside of the vehicle body. The reference numeral 137 in the figures denotes ribs.

The right-hand leg portion 95 has its upper end fitted to the fitting portion 109 of the upper portion 91 of the center member 71, and the fitting portions are welded together.

The coupling member 69 and the upper portion 91 of the center member 71 are connected together with a side plate 141.

Figure 20:
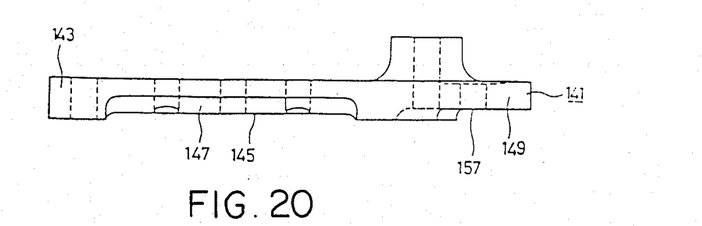
FIGS. 20 and 21 are plan and side views of the side plate of the cycle.
Figure 21:
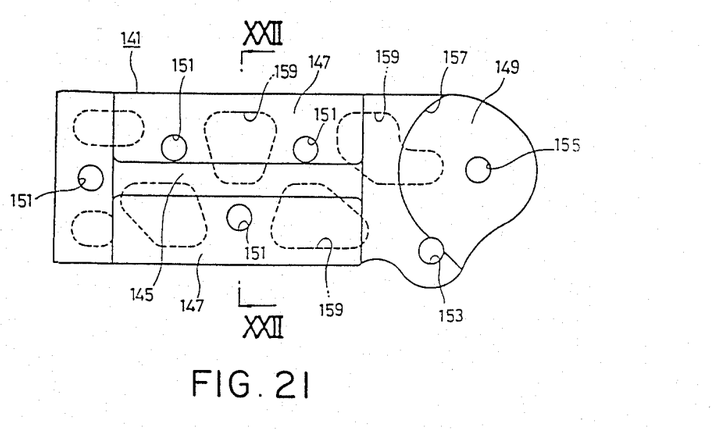
Figure 22:
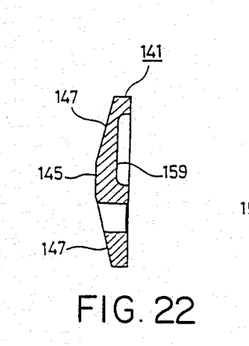
FIG. 22 is a sectional view along line XXII—XXII of FIG. 21.

The side plate 141 is shown in detail in FIGS. 20, 21 and 22 which are respectively a plan view, side view and sectional view which is taken along the line XXII—XXII of FIG. 21. As illustrated, the side plate 141 has a thick-walled portion 143 at the front end, slant surfaces 147 extending obliquely upward and downward, respectively, from a vertically central portion 145, and a shock absorber mounting portion 149 at the rear end.

Bolt receiving bores 151, 153 and 155 are provided in the thick-walled portion 143, the slant surface portions 147 and the shock absorber securing portion 149 in such a manner that the bores extend therethrough horizontally, and a cut portion 157 is formed at the left-hand side of the shock absorber securing portion 149. The reference numeral 159 in the figures denotes grooves defined by hollow walls.

Figure 23:
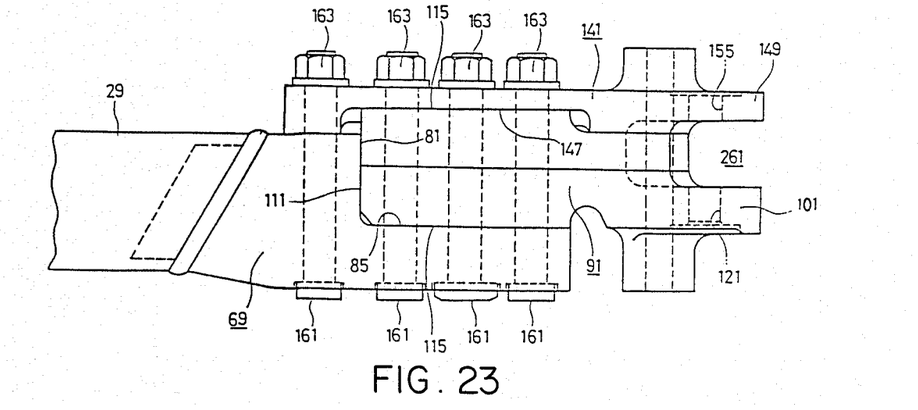
FIG. 23 is a plan view showing the connecting member and the center member in their connected state.

The coupling member 69 and the upper portion 91 of the center member 71 are connected as shown in FIG.

23 which is a plan view. More specifically, first, the upper portion 91 of the center member 71 is positioned at the right-hand side of the coupling member 69 in such a manner that the fitting surfaces 81 and 111 are fitted to each other and the slant surfaces 85 and 115 are fitted to each other, and the side plate 141 is positioned at the right-hand side of the upper portion 91 of the center member 71 in such a manner that the slant surfaces 147 of the side plate 141 are fitted to the slant surfaces 115 of the upper portion 91. Then, bolts 161 are received through the bolt receiving bores 87, 117 and 151, respectively, and the three members are fastened together by tightening nuts 163. Accordingly, the upper frame member 29 can be detached from frame 9 by removing the bolts 59 for fastening the upper frame member 29 to the head pipe 17 and the bolts 161 for fastening the former to the center member 71.

The connecting portion 97 of the center member 71 and the rear portion of the right-hand lower frame member 31B are connected by a cross pipe 165. A mounting piece 167 is provided on the cross pipe 165 in such a manner as to be suspended from a position closer to the right-hand end thereof.

The left-hand connecting plate 33A has its front end fitting portion (not shown) fitted into an opening 169 provided in the connecting portion 97, and the fitting portions are welded together to thereby connect the connecting plate 33A to the connecting portion 97. Each of the left and right connecting plates 33A and 33B is formed so as to be hollow by appropriately welding a plate member to a member which opens to the inside of the vehicle body.

Figures 24, 25:
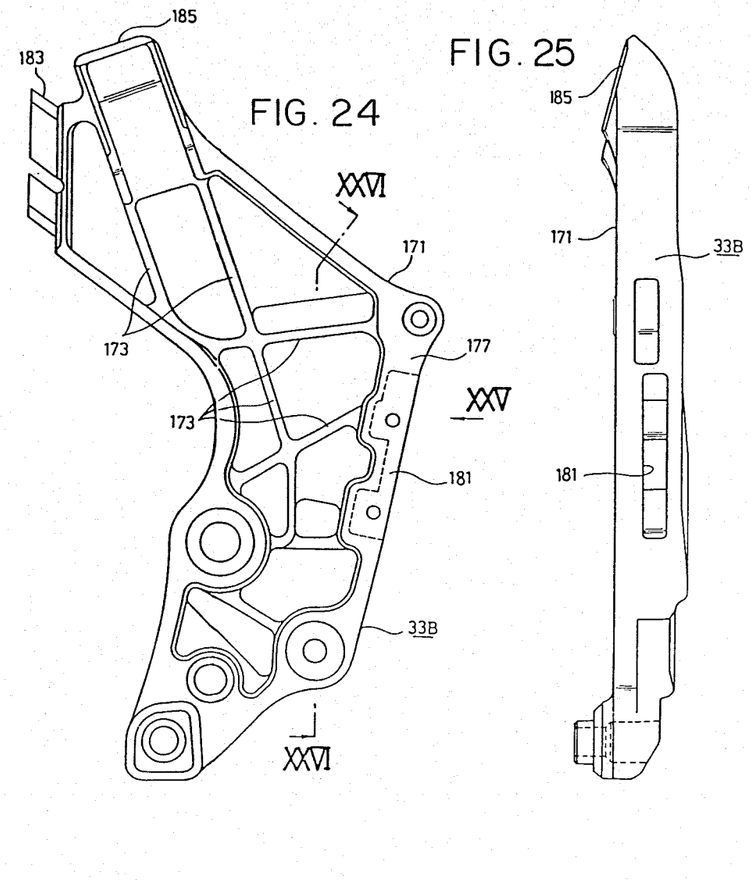
FIG. 24 is a front view of the right-hand connecting plate.
FIG. 25 shows the connection as seen in the direction of arrow XXV in FIG. 24.
Figure 26:
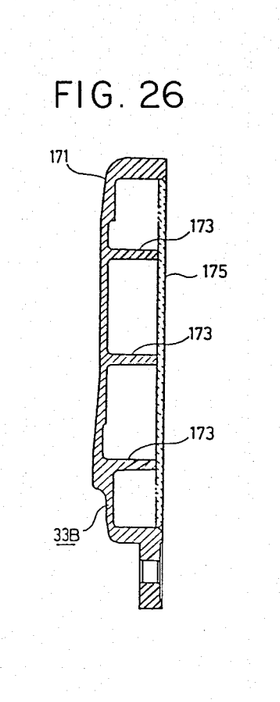
FIG. 26 is a sectional view along line XXVI—XXVI in FIG. 24.

FIG. 24 is a front view of a member 171 which opens to the inside of the vehicle body and which is employed to form the right-hand connecting plate 33B; FIG. 25 shows the member 171 as viewed in the direction of the arrow XXV of FIG. 24; and FIG. 26 is a sectional view taken along the line XXVI—XXVI of FIG. 24.

The member 171 has a plurality of ribs 173 projecting toward the inner side of the vehicle body. A plate member 175 is welded to the inner side of the member 171 to form a hollow connecting plate 33B. A recess 181 for mounting a master cylinder 179 is formed in a rear frame portion 177 of the member 171.

The right-hand connecting plate 33B thus formed has its upper fitting portion 183 fitted to the rear end of the right-hand lower frame member 31, and the fitting portions are welded together. Further, the leg portion 95 is fitted into an opening 185 provided in the upper portion of the connecting plate 33B, and the fitting portions are welded together, thus connecting together the three members. Accordingly, the rear end of the upper frame member 29 is connected to the rear ends of the left and right lower frame members 31 through the center member 71. The left and right leg portions 93 and 95 are offset from each other in the longitudinal direction of the vehicle so as to enable a carburetor 187 to be readily adjusted from the rear side of the left-hand leg portion 93.

Each of the left and right connecting plates 33A and 33B has a portion 189 extending rearwardly from the corresponding lower frame member 31 substantially continuously, and a lower portion 191 extending downwardly from the rear end of the extending portion 189. A step securing portion 193 is formed on the outer side of each lower portion 191.

A bore 196 for disposing a pivot shaft 195 is formed in the vertically central portion of each of the left and right lower portion 191, and the lower ends of the lower portions 191 are connected together with a cross pipe 197. A bifurcated mounting portion 199 is provided so as to project forwardly from each side of the front portion of the cross pipe 197, and mounting pieces 200 are provided so as to project rearwardly from the rear portion of the cross pipe 197.

The right-hand space 201 which is defined by the extension 189 and the upper part of the lower portion 191 of the right-hand connecting plate 33 is made larger than the left-hand space 203 which is defined by those of the left-end connecting plate 33, and a kick pedal is disposed within the right-hand space 201.

The reference numeral 205 denotes an engine hanger which is provided between the mounting pieces 129, 167 and the bifurcated securing portions 199.

The engine hanger 205 is constituted by a pair of left and right members 205A, 205B each of which is hollow and has a rectangular cross-section. Each member of the engine hanger 205 has a bifurcated portion 207 at the upper end which it is fastened to the corresponding one of the mounting pieces 129 and 167 by means of a bolt 208 and a nut, an upper portion 209 extending from the bifurcated portion 207 downwardly and obliquely forward, a curved portion 221 connected to the lower end of the upper portion 209, and a rear portion 213 extending rearwardly from the rear end of the curved portion 211 and fastened at its rear end to the corresponding bifurcated portion 199 by means of a bolt 212 and a nut.

A rod 215 extends horizontally between the upper ends of the curved portions 211, and a rod 217 extends horizontally between the rear portions 213 at positions closer to their front ends.

The engine 7 in this embodiment is a two-cycle one-cylinder engine having a cylinder 219 projecting obliquely forward from the upper portion of a crankcase 221. The engine 7 is mounted on the body frame 9 in such a manner that the front and lower portions of the crank case 221 are rigid-mounted to the rods 215 and 217, respectively.

A suction pipe 223 projects from the rear portion of the cylinder 219. A carburetor 187 and an air cleaner 225 are connected in series to the suction pipe 223.

An exhaust pipe 227 has a proximal portion 229 extending from the cylinder 219 forwardly and obliquely downward, an intermediate portion 231 extending downwardly from the proximal portion 229, an extending portion 233 extending upwardly from the intermediate portion 231 through a bent portion, a chamber 235 connected to the upper end of the extending portion 223 and extending rearwardly while curving, an extending portion 237 extending rearwardly from the chamber 235, and a muffler 239 provided at the rear end of the extending portion 237.

The rear fork 25 extends rearwardly from the above-described pivot shaft 195, and the rear wheel 5 is supported at the rear end of the rear fork 25. The rear wheel 5 is driven by means of power derived from the engine 7 through a chain 241.

A progressive link mechanism 243 is provided between the rear fork 25 and the body frame 9, and the rear wheel 5 is suspensibly supported through the shock absorber 245 which is interposed between the body frame 9 and the progressive link mechanism 243.

The progressive link mechanism 243 consists of a first link 247 pivotally connected between the mounting pieces 200 on the cross pipe 197 through a rod 247, and a second link 255 pivotally connected to the front portion of the rear fork 25 through a rod 251 and having the rear end of the first link 249 pivotally connected to its intermediate portion through a rod 253. The lower end of the shock absorber 245 is pivotally connected to the distal end portion of the second link 255 by means of a bolt 257 and a nut.

The shock absorber 245 has its upper mounting piece 259 positioned within a shape 261 defined by the shock absorber mounting portions 101 and 149, and the mounting piece 259 is connected to the rear end of the upper frame member 29 by means of a nut and a bolt 263 which is received through bolt receiving bores 121, 155 and the mounting piece 259.

The reference numeral 265 denotes a fuel tank which is fastened to the upper frame member 29 and is detachable from the frame 9, together with the upper frame member 29.

Figure 27:
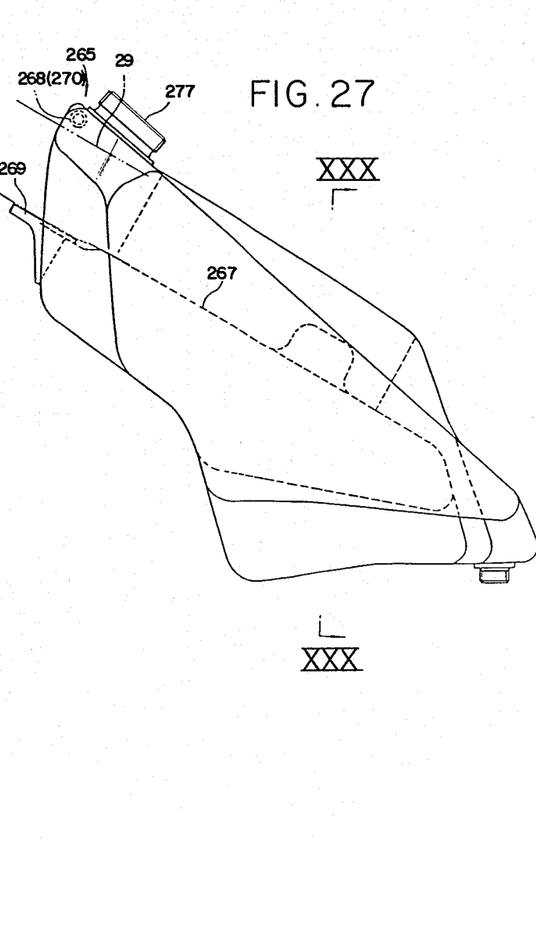
FIGS. 27 to 29 are side, front and plan views of the fuel tank of the cycle.
Figure 28:
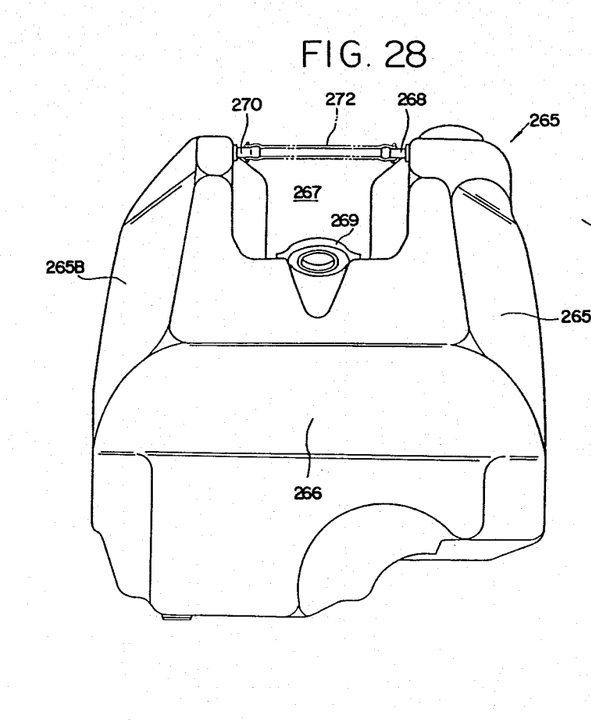
Figure 29:
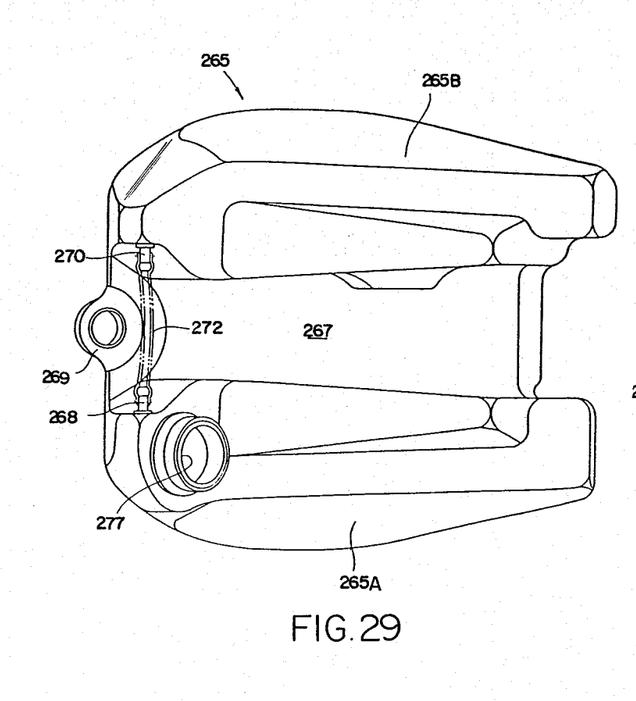
Figure 30:
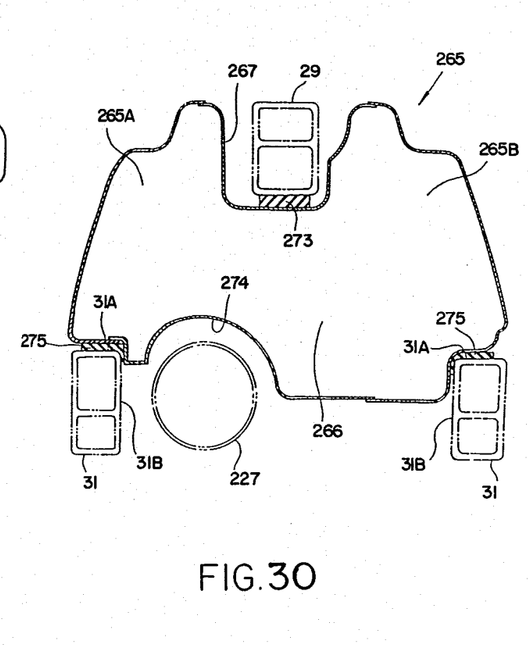
FIG. 30 is a sectional view along line XXX—XXX of FIG. 27.

The fuel tank 137 is shown in detail in FIGS. 27, 28, 29 and 30, which are a side view, front view, plan view and sectional view taken along the line XXX—XXX of FIG. 27. As illustrated, the fuel tank 265 consists of a pair of left and right side portions 265A, 265B and a connecting portion 266 which connects together the side portions 265A and 265B which extend rearwardly on and substantially along the left and right lower frame members 31. The fuel tank 265 has a substantially U-shaped cross-section, and a recess 267 which extends longitudinally of the vehicle is defined between the left and right side portions 265A and 265B.

The upper frame member 29 is disposed within the recess 267 and a mounting piece 269 which projects from the front end of the bottom of the recess 267 is fastened to the lower side of the upper frame member 29 by means of a bolt 271. A resilient material 273 is interposed between the rear portion of the bottom of the recess 267 and the lower surface of the upper frame member 29, and the lower portions of both sides of the rear portion of the fuel tank 265 are resiliently mounted on and engaged with the upper and inner surfaces 31A and 31B of the lower frame members 31, respectively, through resilient materials 275. In this way, the fuel tank 265 is mounted on the body frame 9 in such a manner that the longitudnal movement of the fuel tank 265 is limited by the mounting piece 269 and the vertical and lateral movements of the fuel tank 265 are limited by the resilient materials 273, 275, the upper frame member 29 and the lower frame members 31.

The fuel tank 265 has a fuel filler port 277 provided at the front end of the upper side of the left side portion 265A. A tubular member 268 which is provided so as to project inward from the inner surface of the left side portion 265A at the front upper end position is connected to a tubular member 270 projecting inward from the inner surface of the right side portion 265B at the front upper end position through a tube 272 above the upper surface of the upper frame member 29. Thus, air within the right side portion 265B is vented at the time of supply of fuel by means of the tubular members 268, 270 and the tube 272. The reference numeral 274 in the figures denotes a recess provided in correspondence with the exhaust pipe 227.

The reference numeral 301 denotes a radiator which is connected to the frame 9 through securing pieces 303 respectively formed on the lower sides of the left and right lower frame members 31 and a mounting piece 305 which is formed on the front side of the curved portion 211 of the right-hand engine hanger 205. The radiator 301 can be detached, together with the engine 7, from the frame 9 by disconnecting the radiator 301 from the mounting pieces 303 and removing the engine hanger 205.

The radiator 301 is constituted by a main radiator 307 disposed on the right-hand side and a sub-radiator 309 disposed on the left-hand side.

The main radiator 307 is disposed so as to face substantially forward, the exhaust pipe portions 231, 233 and the chamber 235 being disposed in the space defined on the left-hand side of the main radiator 307. The sub-radiator 309 is disposed at a position obliquely above the chamber 235, the sub-radiator 309 facing obliquely upward at substantially the same angle of inclination as that of the head pipe 17. Thus, cooling water is cooled in the two radiators 307 and 309.

A pair of left and right seat rails 313 are mutually fastened to the rear end of the upper frame member 29 by means of a bolt 311 received through the bolt receiving bores 119 and 153, the seat rails 313 extending rearwardly, and the muffler 239 is supported at the rear end of the left-hand seat rail 313.

A back pipe 315 extends obliquely forward and downward from each of the left and right seat rails 313 at a position closer to the rear end thereof, and the lower end of each back pipe 315 is fastened to the rear frame 27, the left and right back pipes 315 being disposed at different angles of inclination in the longitudinal direction of the vehicle.

A seat 317 has an engagement member 321 suspended from the front portion of a seat bottom plate 319. The engagement member 321 is engaged with an engagement piece 323 projecting from the upper side of the upper frame member 29. Mounting pieces 325 which are suspended from both sides, respectively, of the rear portion of the seat bottom plate 319 are connected to two axial ends, respectively, of a cross member 327 by means of a bolt 329, the cross member 327 being stretched between the rear portions of the seat rails 313. In this way, the seat 317 is connected to the frame 9, and the seat bottom plate 319 is mounted on the upper frame member 29 and the seat rails 313.

In this embodiment, arranged as described above, the front frame portion 23 is constituted by one upper frame member 29 connected to the head pipe 17 and a pair of left and right lower frame members 31 which are also connected to the head pipe 17, and the rear end of the upper frame member 29 and the rear ends of the lower frame members 31 are connected together through the center member 71. Accordingly, the body frame 9 has high rigidity. Since the upper end of the shock absorber 245 is secured to the rear end of the upper frame member 29 thus arranged, the load from the shock absorber 245 is advantageously received by the body frame 9. Further, a large stroke can be ensured for the shock absorber 245. In particular, the front end of the upper frame member 29 is connected to the head pipe 17, and the rear end of the upper frame member 29 is connected to the two lower frame members 31 through the center member 71; therefore, the body frame 9 has sufficiently high rigidity to bear jumping and landing, so that it is suitable for off-road driving vehicles.

As will be clear from the foregoing description, the present invention provides a motorcycle body frame particularly suitable for off-road driving vehicles, which has satisfactorily high rigidity and sufficient toughness to bear jumping and landing and which enables a large stroke to be ensured for the shock absorber.

Further, if the upper frame member 29 is removed from the body frame 9 by untightening the fastening bolts 59 and 161 which are attached to the front and rear portions of the upper frame member 29, maintenance of the engine 7 or other parts which are disposed near or below the front frame portion 23 can readily be conducted from the upper side of the area between the lower frame members 31. Thus, the body frame structure is advantageous in terms of the maintenance of the engine 7 or other parts.

In addition, since the upper frame member 29 is detachably connected to the body frame 9, the upper frame member 29 can be utilized as a member for securing parts mounted on the vehicle body, for example, the fuel tank 265, so that the body frame structure is also advantageous in terms of the layout of the parts mounted on the vehicle body.

What is claimed is:

1. In a motorcycle (1) having an engine (7) disposed between front and rear wheels (3, 5) and supported by a body frame (9) made of aluminum-based alloy and comprising a front frame portion (23) and a rear frame portion (27), said front frame portion extending rearwardly from a head pipe (17) steerably supporting an upper portion of a front fork (11) for suspending said front wheel, and said rear frame portion being connected to said front frame portion and having a rear fork (25) for supporting said rear wheel pivotally connected thereto, the improvement consisting of a body frame structure comprising
    (a) said front frame portion, being constituted by one upper frame member (29) and left and right lower frame members (31), said upper frame member extending rearwardly from an upper portion of said head pipe (17) above said engine, and said lower frame members extending rearwardly from a lower portion of said head pipe above or through an upper side of said engine;
    (b) a coupling member (71) connecting a rear portion of said upper frame member and rear portions of said lower frame members, said upper frame member being detachably connected to said head pipe and said coupling member;
    (c) a fuel tank (265) mounted on said front frame portion (23) in a space defined between said upper frame member (29) and said left and right lower frame members (31), said fuel tank (265) having at least two upwardly projecting portions, a fuel filler port (277) in an upper portion of one of said upwardly projecting portions, and a tubular member providing communication between an upper end of the projecting portion provided with said fuel filler port and an upper end of another of said at least two upwardly projecting portions.

2. The improvement according to claim 1, including an engine hanger comprising said front frame portion (23), said rear frame portion (27) and said coupling member (71), a rear portion of said front frame portion being fitted to a front portion of said coupling member and a front portion of said rear frame portion being fitted to a rear portion of said coupling member, wherein an end portion of said engine hanger is secured to said coupling member.

3. The improvement according to claim 2, comprising engine hangers respectively suspended from longitudinally central portions of said left and right frame members (31), said engine (7) being supported by said engine hangers, and a radiator having an upper portion secured to front portions of said frame members and a lower portion secured to lower portions of said engine hangers on the sides thereof closer to said engine.

4. The improvement according to claim 1, comprising a shock absorber (245) disposed between said body frame (9) and said rear fork (25), an upper end of said shock absorber being secured to an upper end of said upper frame member (29).

5. The improvement according to claim 1, wherein each of said upper and lower frame members (29, 31) is a hollow member having a reinforcing wall laterally extending between vertically central portions of said member so as to define a substantially B-shaped cross-section, said reinforcing wall of said upper frame member being closer to an upper side of said upper frame member, and said reinforcing wall of each of said lower frame members being closer to the lower sides of said lower frame members.

6. The improvement according to claim 1, comprising an attachment portion integral with said had pipe (17) and projecting therefrom, a front end of said frame member being attached to said attachment portion.

7. The improvement according to claim 1, comprising a seat (317) extending from an upper side of said front frame portion (23) to an upper side of said rear frame portion (27), said rear frame portion having a rearwardly extending seat rail (313), the bottom of a front portion of said seat being secured to said upper side of said front frame portion by means of an engagement member (321) engaged with an engagement piece (323), a rear portion of said seat being rigidly secured to said seat rail.

8. The improvement according to claim 7, wherein said seat (317) extends to an upper side of said seat rail (313) and has side portions respectively suspended from both sides of said front portion of said seat toward upper surfaces of said lower frames and being contiguous with an outer surface of the corresponding lower frame member.

9. The improvement according to claim 1, comprising an intake device disposed at the laterally inner side of one of said left and right lower frame members, a pair of left and right cross members for connecting said upper and lower frame members (29, 31) in the vicinity of said intake device, the cross member on the side of said intake device being offset forwardly or rearwardly with respect to the cross member on the side remote from said intake device.

10. The improvement according to claim 1, wherein said engine (7) has a cylinder projecting from a crankcase also serving as a transmission case, said left and right lower frame members (31) supporting said engine and each having its rearwardly extending portions passing through the region above said crankcase, and a portion suspended from a rear end of said extending portion having a pivot shaft which carries said rear fork (25), a kick starter for starting said engine being disposed at a rear side of said crankcase, at least a rear portion of said extending portion and an upper portion of said suspended portion disposed on the side of said kick starter being offset upwardly and rearwardly with respect to the corresponding portion of the frame member on the side remote from said kick starter, the latter being disposed so as to face said offset rear portion of said extending portion and said offset upper portion of said suspended portion.

* * * * *